No. 736,320. PATENTED AUG. 11, 1903.
J. C. WALTER.
WEED CUTTING MACHINE.
APPLICATION FILED NOV. 4, 1902.
NO MODEL.
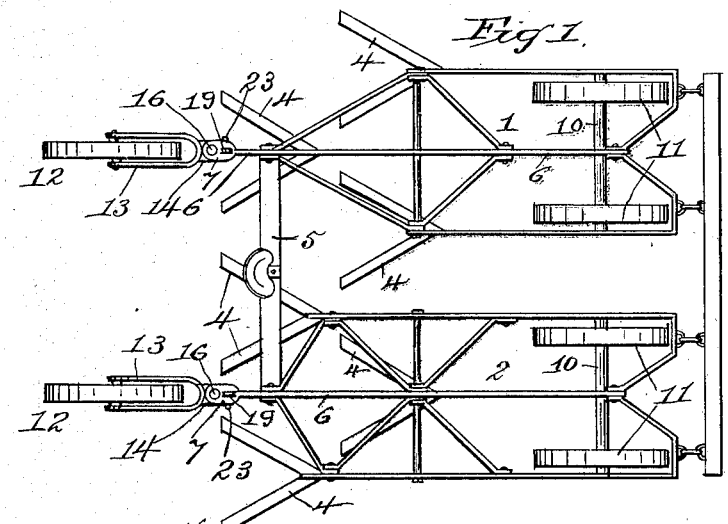
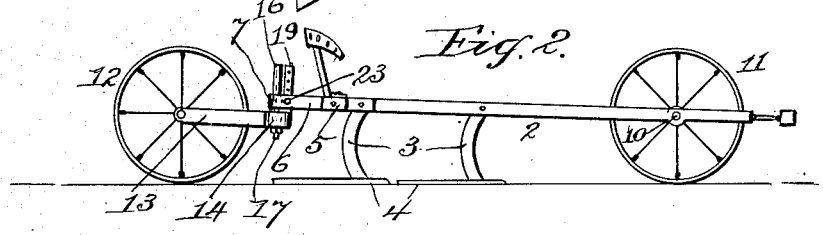
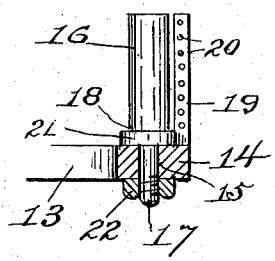
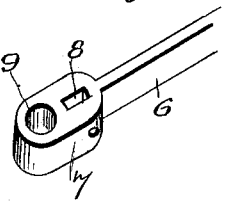
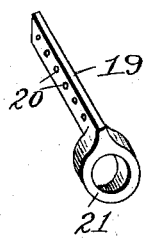
Witnesses
C. J. Belt
M. J. Madigan
John C. Walter, Inventor
By Tabert Whitman & Co.
Attorneys No. 736,320. Patented August 11, 1903.

UNITED STATES PATENT OFFICE.

JOHN C. WALTER, OF ATHENA, OREGON.

WEED-CUTTING MACHINE.

SPECIFICATION forming part of Letters Patent No. 736,320, dated August 11, 1903.

Application filed November 4, 1902. Serial No. 130,074. (No model.)

*To all whom it may concern:*

Be it known that I, JOHN C. WALTER, a citizen of the United States, residing at Athena, in the county of Umatilla and State of Oregon, have invented certain new and useful Improvements in Weed-Cutting Machines; and I do hereby declare the following to be a full, clear, and exact description of the invention, such as will enable others skilled in the art to which it appertains to make and use the same.

This invention relates to weed-cutting machines, and pertains especially to means for adjusting the frame to vary the height of the cutters.

The object of the invention is to provide a novel and peculiar device of simple operation for connecting the rear wheels to the frame of the machine and for adjusting the frame to various heights, as may be desired.

In the accompanying drawings, forming part of this application, Figure 1 is a top plan view of a machine embodying my invention. Fig. 2 is a side elevation. Fig. 3 is a detail section showing the adjusting device in elevation. Fig. 4 is a perspective view of one of the plates. Fig. 5 is a perspective view of one of the frame-lugs.

The same numeral-references denote the same parts in the figures of the drawings.

The frame of the machine is in two parts 1 and 2, which have depending hangers 3, carrying cutters 4. The frame parts are connected by a seat-beam 5, extending from one to the other of the central frame-pieces 6. The pieces 6 terminate at the rear of the machine in enlargements or lugs 7, having a slot 8 and an aperture 9. The front axles 10 are journaled in the sides of the frame and have wheels 11 within the frame. The rear wheels 12 are journaled in forks 13, which terminate in a lug 14, having an aperture 15.

The means for connecting the frame and the forks and for adjusting the frame so as to vary the height of the cutters, as desired, consists of a post 16, having a screw-stem 17, a shoulder 18, formed by the post and stem, a plate 19, having perforations or pin-holes 20 and provided with a collar 21. The collar 21 fits the stem 17 and is held against the shoulder 18 by the lug 14 and a nut 22. The post 16 extends through the frame-lug 7, and the plate 19, being of the same length of the post, extends through the slot 8, so that the frame may be adjusted on the post and plate by a suitable pin 23, passing through the frame-lug 7 and the plate-aperture holes 20. The frame parts are operated by a separate post and plate; but they being duplications only one is here described in detail.

Having thus described my invention, what I claim as new, and desire to secure by Letters Patent, is—

1. In a weed-cutting machine, the combination, with the frame having a central beam terminating in a lug, and the rear-wheel forks terminating in a lug, of the post having a stem secured in the fork-lug, a perforated plate extending with the post through the frame-lug and having a collar located between the said lugs and forming the only connection between the post and the plate, and a suitable pin extending through the frame-lug to adjust the latter on the post and collar.

2. The combination, with a weed-cutting machine having a central beam terminating in a lug having an aperture and a slot, and the rear-wheel forks, of means for adjusting the beam comprising a post having a stem secured in the forks and working through said aperture, a perforated plate working through said slot, a collar on the plate and held by the stem so as to form the only connection between the post and the plate, and a suitable adjusting-pin.

3. The combination, with the frame having central beams terminating in lugs each provided with an aperture and a slot, and wheel-forks terminating in lugs under the beam-lugs, of the posts having screw-stem connections with the fork-lugs and working through said apertures, the perforated plates operated in the said slots, collars on the plates and held by the stems so as to form the only connections between the posts and the plates, and suitable adjusting-pins extending through the beam-lugs.

In testimony whereof I affix my signature in presence of two witnesses.

JOHN C. WALTER.

Witnesses:
MARY E. GROSS,
H. B. LEAM.